(12) United States Patent
Riondato (10) Patent No.: US 7,537,281 B2
(45) Date of Patent: May 26, 2009

(54) BICYCLE SADDLE

(75) Inventor: Francesco Riondato, Bassano del Grappa (IT)

(73) Assignee: M. D' A. Francesco Riondato, Bassano del Grappa (IT)

( * ) Notice: Subject to any disclaimer, the term of this patent is extended or adjusted under 35 U.S.C. 154(b) by 0 days.

(21) Appl. No.: 10/544,179

(22) PCT Filed: Jan. 30, 2004

(86) PCT No.: PCT/EP2004/000824

§ 371 (c)(1),
(2), (4) Date: Aug. 2, 2005

(87) PCT Pub. No.: WO2004/069636

PCT Pub. Date: Aug. 19, 2004

(65) Prior Publication Data

US 2006/0152047 A1 Jul. 13, 2006

(30) Foreign Application Priority Data

Feb. 4, 2003 (IT) .......................... VI2003A0020

(51) Int. Cl.
*B62J 1/00* (2006.01)
(52) U.S. Cl. .................................. 297/202; 297/215.1
(58) Field of Classification Search .............. 297/195.1, 297/202, 215.1, 215.16, 201, 452.21, 452.22
See application file for complete search history.

(56) References Cited

U.S. PATENT DOCUMENTS

| 556,250 | A | * | 3/1896 | Brown | 297/202 |
| 584,637 | A | * | 6/1897 | Jarvis | 297/202 |
| 672,193 | A | * | 4/1901 | McKinlay | 264/222 |
| 2,011,222 | A | * | 8/1935 | Kingman | 401/40 |
| 4,063,775 | A | | 12/1977 | Mesinger | |
| 5,011,222 | A | | 4/1991 | Yates et al. | |

(Continued)

FOREIGN PATENT DOCUMENTS

DE 84678 6/1895

(Continued)

OTHER PUBLICATIONS

Selle Italia: "Saddle Catalogue 2003" Sep. 2002, Selle Italia, Italy, XP002284753.

(Continued)

*Primary Examiner*—Milton Nelson, Jr.
(74) *Attorney, Agent, or Firm*—Bucknam and Archer (57) ABSTRACT

The finding regards a bicycle saddle of the type which has two identical portions (1', 1"), longitudinally symmetrical. Each of these two portions has a rear part (2), a part (5) of transversal middle plane as well as a front part (6). The two portions (1' and 1") of the saddle are separated, at their intermediate parts (5) and front parts (6), by a channel (8). Thanks to this particular configuration the user arranges his buttocks very comfortably on the rear part of the saddle and avoids the squashing of his pelvic viscera. The saddle according to the finding is suitable both for those who use a bicycle for short journeys and for users who use a bicycle for long journeys like, for example, cycling-lovers and amateur and professional sports people).

3 Claims, 6 Drawing Sheets

U.S. PATENT DOCUMENTS

| | | | | |
|---|---|---|---|---|
| 5,356,205 | A * | 10/1994 | Calvert et al. | 297/452.41 |
| 5,823,618 | A | 10/1998 | Fox et al. | |
| 6,149,230 | A | 11/2000 | Bontrager | |
| 6,224,151 | B1 * | 5/2001 | McMullen, Jr. | 297/202 |
| 6,231,122 | B1 | 5/2001 | Goldstein | |
| 6,257,662 | B1 | 7/2001 | Yates | |
| 6,450,572 | B1 * | 9/2002 | Kuipers | 297/195.1 |
| 6,669,283 | B2 * | 12/2003 | Yu | 297/215.16 |
| 2001/0045765 | A1 | 11/2001 | Nelson | |

FOREIGN PATENT DOCUMENTS

| | | |
|---|---|---|
| DE | 82605 | 8/1895 |
| DE | 42 06 501 | 8/1992 |
| DE | 29907473 | 7/1999 |
| DE | 29823624 | 9/1999 |
| WO | WO 9211175 | 7/1992 |
| WO | WO 9914103 | 3/1999 |

OTHER PUBLICATIONS

International Search Report.

* cited by examiner

//BICYCLE SADDLE

CROSS REFERENCE TO RELATED APPLICATIONS

Applicant claims priority under 35 U.S.C. §119 of Italian Application No. VI2003A000020 filed Feb. 4, 2003. Applicant also claims priority under 35 U.S.C. §365 of PCT/EP2004/000824filed Jan. 30, 2004. The international application under PCT article 21(2) was published in English.

BACKGROUND OF THE INVENTION

The present finding regards a bicycle saddle.

It is known that manufacturers of bicycle saddles, both for sports cycles and leisure cycles, are continually trying to make saddles that are as comfortable as possible for the user.

This is particularly complex, mainly due to the fact that users, when they sit down on a bicycle saddle, are subjected to the squashing of the genital organs. This is also experienced by people who use a bicycle for short road journeys, but it is particularly uncomfortable and harmful for people who use a bicycle for long journeys like, for example, cycling-lovers and amateur and professional sportspeople. In particular, to try to avoid the drawbacks described above, saddles that are longitudinally divided into two identical parts next to each other have been devised. As an example we indicate the following documents: U.S. Pat. No. 5,823,618 and DE-A-4206501. Essentially, such types of device foresee the presence of springing elements separated on two portions of the saddle; however, in practical terms, the results that can be obtained with known creations are rather modest and, at the same time, they have substantial constructive complications, which has ensured that their use has been rather modest.

We also indicate the saddles described in German documents 84678 and 82605 and in document U.S. Pat. No. 4,063,775.

BRIEF SUMMARY OF THE INVENTION

The purpose of the present finding is that of realising a bicycle saddle, which is particularly comfortable to use, completely getting rid of the squashing and rubbing of he genital organs of the user, whilst at the same time being simple from the constructive point of view.

According to the finding, this is obtained through a bicycle saddle which has two longitudinally symmetrical portions, which join together at their rear part, in the intermediate zone, as well as in their front end part.

Said two portions are separated, in the central part, at the middle plane, by a long channel that is wider at the rear or simple of equal width, whereas in the rear part of the saddle there is a trough at the longitudinal middle plane of the saddle itself.

The saddle, longitudinally, is divided into two different parts of different width and height and joined by a portion slightly inclined in the upper zone and in the shape of a cove in its side zones. The rear parts are in the form of two small seats joined together through a narrow portion, shaped like a trough with the rear zones slightly concave upwards and the outer side parts convex downwards to follow the curvature of the buttock muscles and intermediate zones which go down with a slight inclination, towards the front parts. Said shapes and widths are foreseen for the optimal housing of the buttocks.

Vice-versa, continuing towards the front end, the width of the parts of the saddle halves; the supports for the sciatic tuberosities and the initial part of the branch of the ischium and the pubis are housed on these parts. The upper surfaces of the front parts, which represent about ⅓ of the length of the saddle, continue the line of the rear parts, but are advantageously tilted upwards up to about 25°.

Sitting on the saddle, the buttocks rest upon the rear parts, whereas the sciatic tuberosities and the initial part of the branch of the ischium and the pubis, lacking in muscular mass, cause a squashing on the front parts, which are equipped with two bearings of soft plastic material about 2 or 3 cm high.

During support, the two front parts go down by squashing, roughly by 1 to 3 cm with respect to the rear parts, due to the body weight consisting of soft material.

The width of the front parts is narrower, so as to allow the free articulation of the hip; moreover, the longitudinal middle plane channel, which divides the two portions of the saddle, allows the "pelvic viscera" not to undergo any squashing and rubbing during pedalling.

BRIEF DESCRIPTION OF THE DRAWINGS

These and other characteristics of the finding shall now be described in detail, with reference to some of its particular embodiments, given as a non-limiting example, with the help of the attached tables of drawings, where.

DETAILED DESCRIPTION OF THE INVENTION

Figure 1:
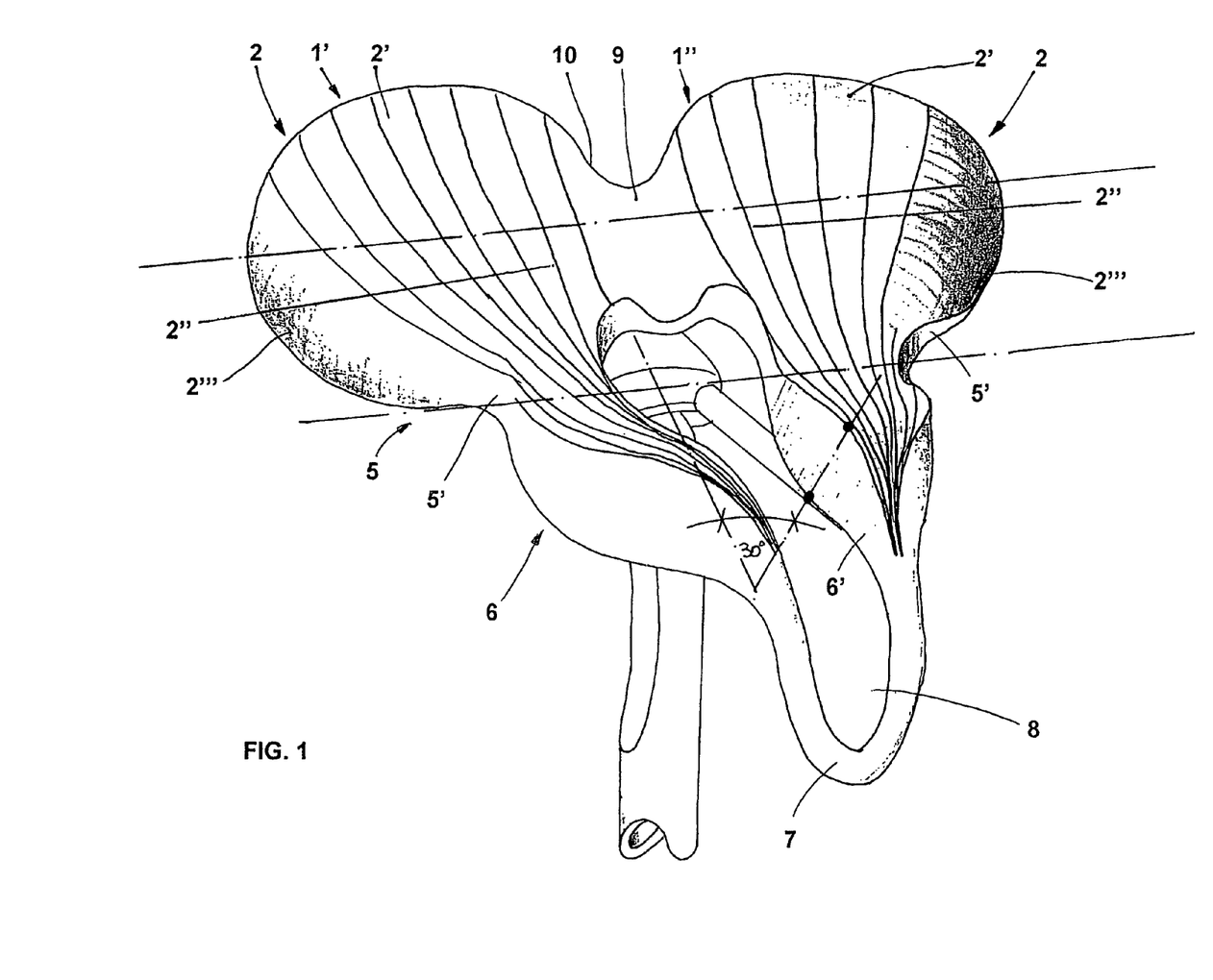
FIG. 1 illustrates an overall perspective view of the saddle according to the finding.

In FIG. 1 it can be seen that the saddle according to the finding has two identical portions 1', 1", longitudinally symmetrical, each of which has the following component parts:

A—a rear part 2, which has a first rear zone 2' with slight upwards concavity: this zone 2' continues at the front with a front zone 2", which has a substantially downwardly inclined configuration, which continues towards the front portions with a depression which goes from 0 cm up to 3 or 5 cm; the outer side parts 2''' are convex downwards to follow the curvature of the buttock muscles.

B—the parts 5 of transversal middle plane, which ease the connection for different widths of the rear parts mentioned above and the front parts (FIG. 3), following the inclined shape of the zones 2"; there are also the side cove-shaped zones 5';

C—the front parts 6, which are lower with respect to the parts 2 by about 1-3 cm and vice-versa slightly inclined upwards up to about 25°; the overall width of the two parts 6 varies from 6 to 15 cm and, at about half of their length, they start to gradually constrict, substantially taking up a V-shaped configuration, with the vertex 7 rounded and which goes down like an eagle's beak. In this way, the configuration of the front parts of the saddle follows that of the sciatic tuberosities and of the branches of the pubic ischium.

As can be seen from FIG. 1, the two portions 1' and 1" of the saddle are separated from each other, at their intermediate parts 5 and front parts 6, by a channel 8 advantageously wider in the rear part, with a width varying from 5 cm up to a minimum of 3 cm. Moreover, the two front zones 2" of the two parts 2 of the saddle are joined together by a narrow portion 9 in the form of a trough; they are also shaped so that the rear edge of the saddle has a slight cove 10, actually at the longitudinal axis of symmetry of the saddle itself.

Figure 3:
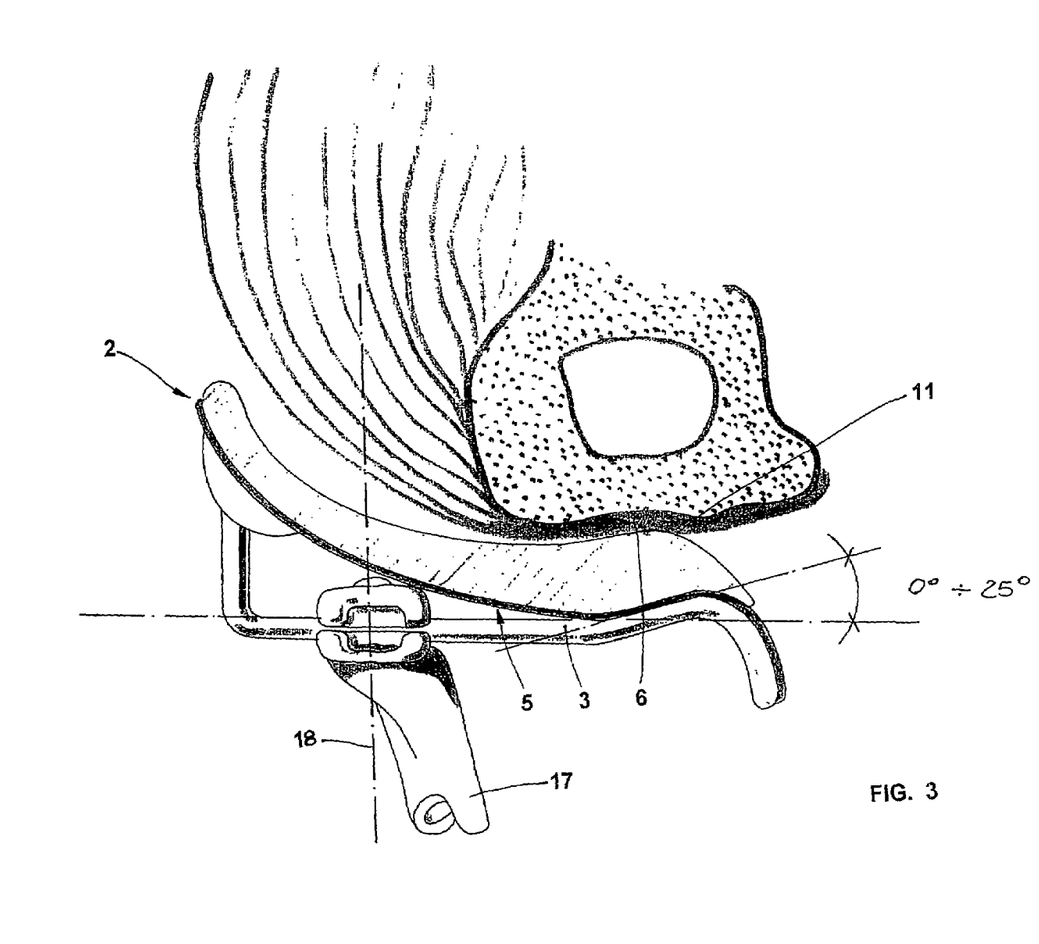
FIGS. 3 and 3A illustrate a longitudinal section, respectively, of the ways of positioning the pelvis and gluteal bones, immediately before and after sitting down on the saddle.
Figure 3A:
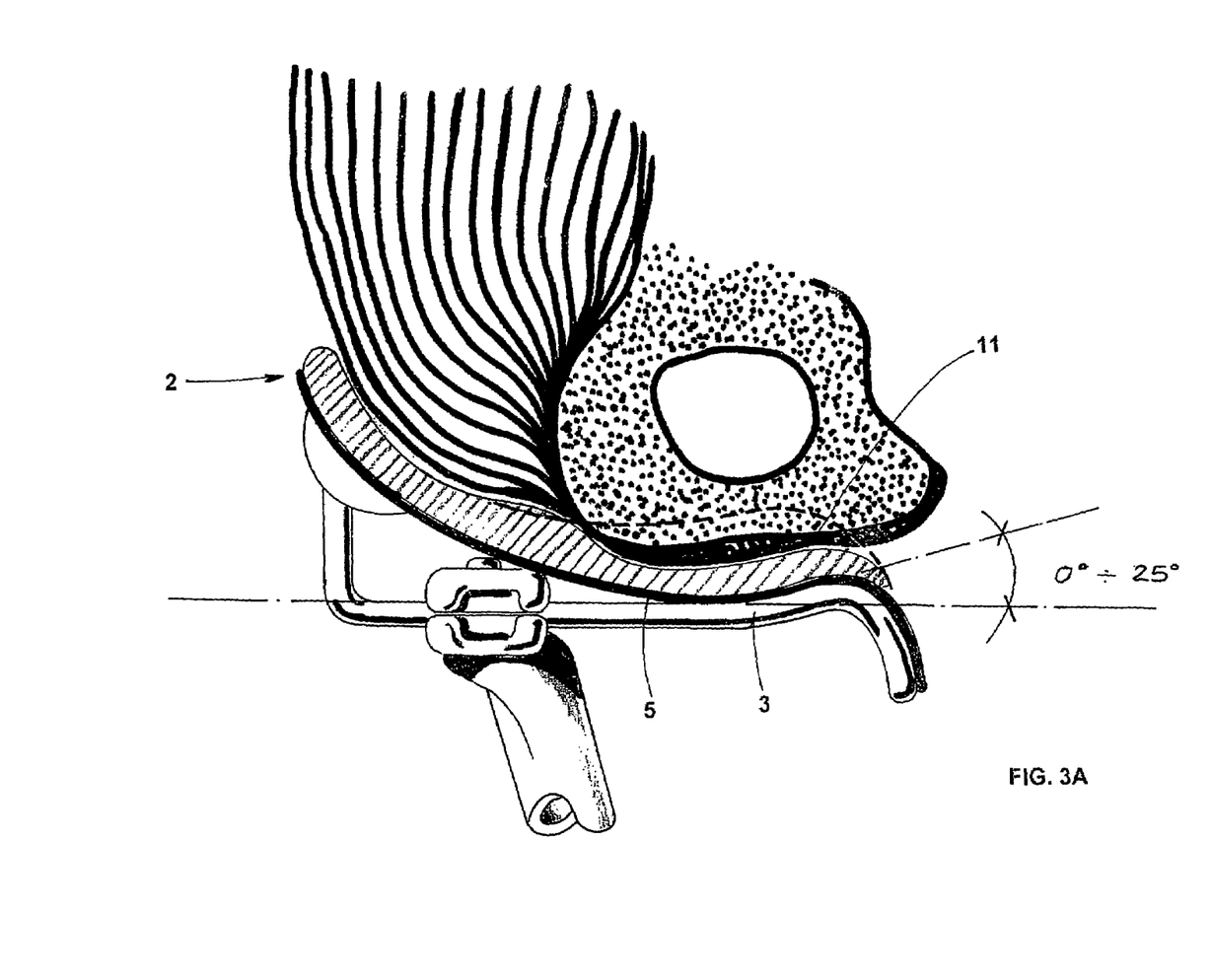

By carefully observing FIG. 3, it can be seen that the front parts 6 of the saddle according to the finding are shaped so that only the sciatic tuberosities 11 and the initial part of the branch of the ischium and the pubis (bone part of the pelvis) rest upon them, which allows free articulation of the hip, as well as allowing 50% of body weight to be supported.

Vice-versa, the rear parts 2 are suitable for allowing optimal reception in the saddle of the buttocks of the user, as well as for supporting about the other 50% of body weight.

Summing up, the saddle is shaped so that the seat is equally shared between the buttocks and the sciatic tuberosities.

The sciatic tuberosities and the initial part of the branch of the ischium and the pubis rest upon the lower parts 6, which are equipped with a bearing made from a soft plastic material, which has the function of replacing the muscular fibres of the sciatic tuberosities 11 and the initial part of the branch of the ischium and the pubis and of eliminating crushing. The upward inclination of the front parts 6 allows the initial part of the branch of the ischium and the pubis to be supported, so that the torso of the body does not tend to fall forwards.

Figure 4:
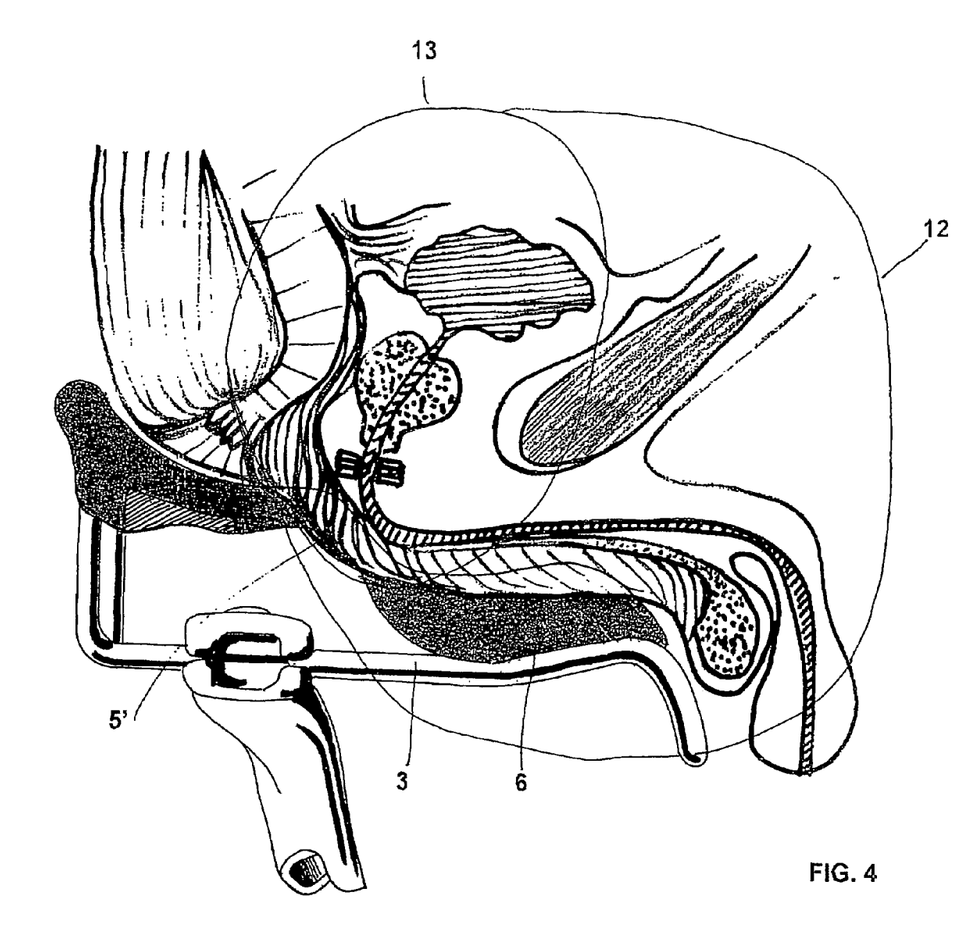
FIG. 4 illustrates a longitudinal section view of the ways of positioning the pelvic viscera, the scrotum and the testicles (or the vagina in the case of a female user)
Figure 5:
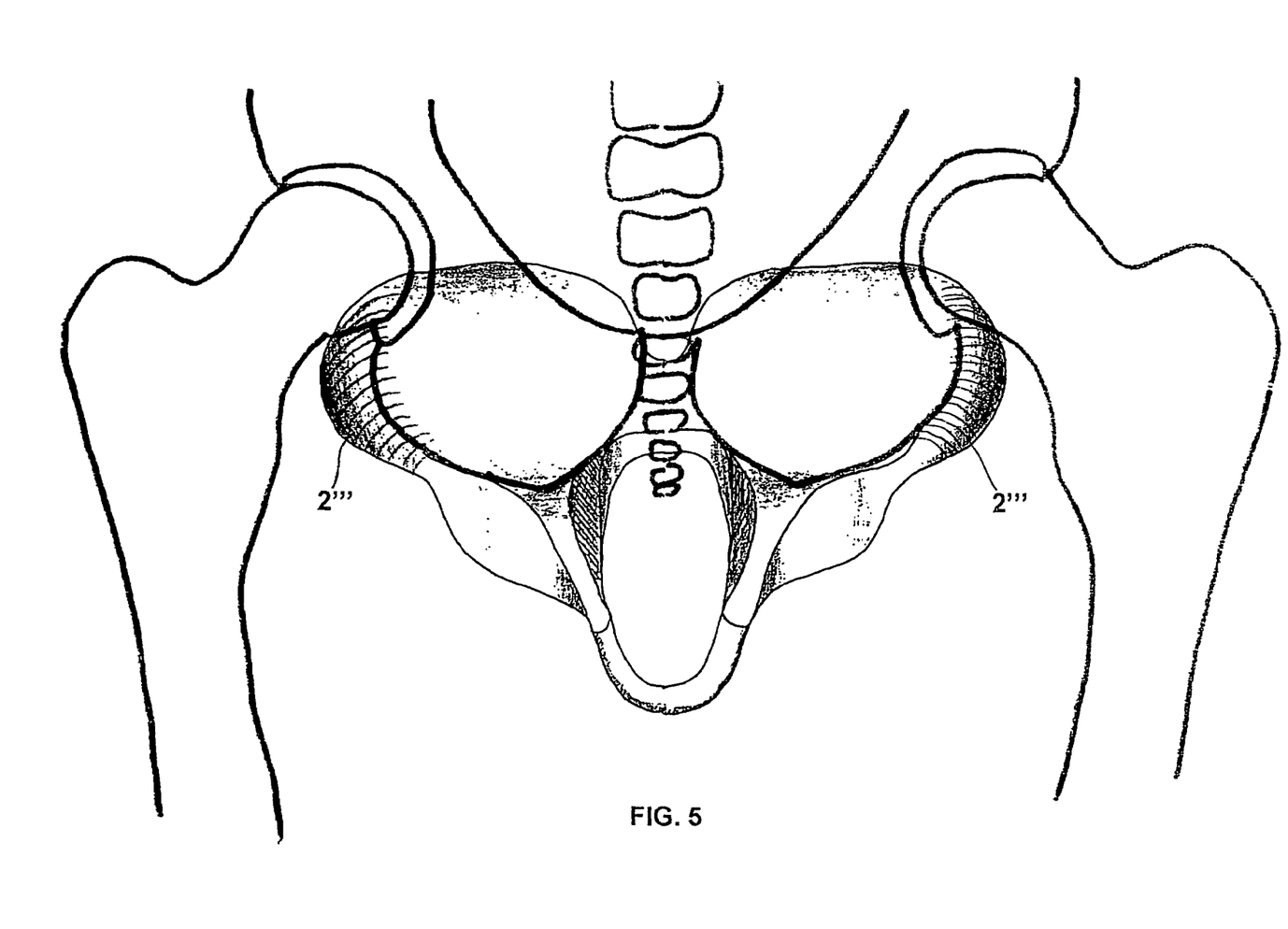
FIG. 5 illustrates a front view of the ways of positioning the pelvis bone, the hip bone and the coccyx bone of the body of the user when they are arranged on the saddle according to the finding.

A fundamental characteristic of the device according to the finding is, indeed, the presence of the channel 8, arranged longitudinally in the middle plane of the saddle and from 3 to 5 cm wide; in particular, said channel are intended to house the pelvic viscera 12 of the user, which can be seen in FIG. 4, which do not undergo any squashing when sitting or rubbing when pedalling. It should be specified that with the term "pelvic viscera", in the case of a man we mean the group of body parts comprising the anus, the sphincter, the bladder, the prostate, the urethra, the spermatheca, the bulb-urethral glands, the orifice of the ejaculatory duct, the testicles and the penis; as for women, the pelvic viscera comprise the anus, the sphincter, the bladder, the ovaries, the uterus, the neck of the uterus, the urethra, the paraurethral gland, the vagina, the clitoris and the large and small lips. Moreover, the nerves, the lymph nodes, the veins and the arteries present at said organs do not undergo any squashing, allowing the blood circulation to flow in a natural, complete and continuous manner.

The channel 8 is wider in the rear part, to avoid the squashing of the group of body parts of the pelvic viscera 13, arranged vertically above said channel: urinary bladder, urethra, spermatheca, ejaculatory duct, prostate, uro-genital diaphragm, transversal surface muscle of the perinium, tendon centre of the perineum.

Moreover, thanks to the presence of the trough 9 in the rear part of the saddle, the coccyx does not hit the seating plane during the bumping movements caused by the contact of the wheels of the vehicle with the unevenness of the ground, so that repercussions on the upper vertebra of the spine are avoided. Moreover, the particular eagle's beak configuration of the front end 7 of the saddle is such as to allow the testicles to not touch the saddle and for women to allow there not to be compression and rubbing of the clitoris and furthermore, at the side of the parts 6, the thigh can be supported to keep oneself balanced when, during racing, the hands move away from the handlebars.

To correctly position the buttocks on the saddle, the user, after having gathered up some speed, must leave his legs dangling, so as to feel the sciatic tuberosities position themselves in its intended part; he must then go back to pedalling, slightly moving the torso forwards and backwards, thus making the buttocks and the sciatic tuberosities become housed correctly on the saddle.

Figure 2:
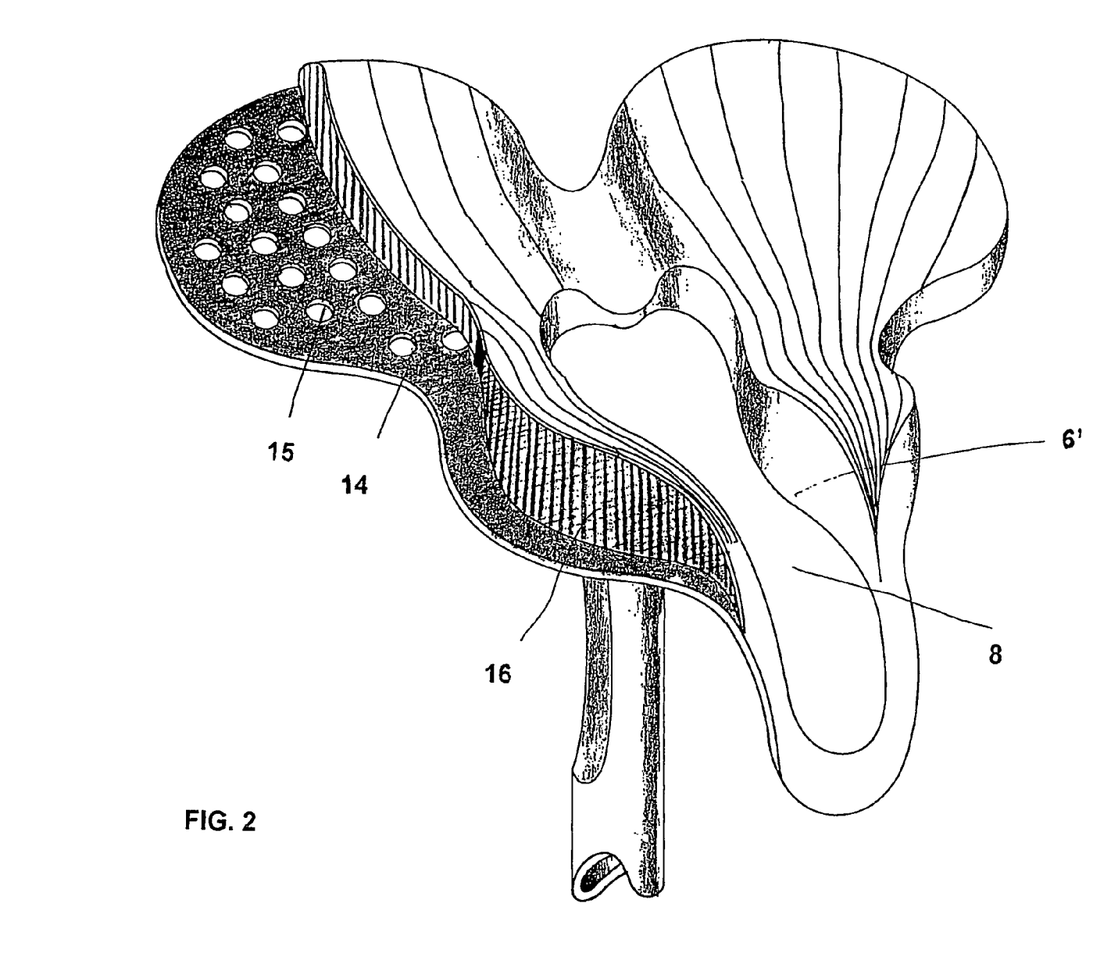
FIG. 2 illustrates an overall perspective view of the aforementioned saddle, with a part sectioned to make the aeration holes and the materials of which it is made visible.

From the constructive point of view, the rear parts 2 of the two portions 1' and 1" of the saddle have a frame 14 of the undersaddle (FIG. 2) with some holes 15 to ease the transpiration of the sweat deriving from the buttocks, when they are under physical stress.

Vice-versa, on the front parts 6 there is a bearing 16 having a thickness of about 3 cm, made from soft plastic material (see FIG. 2), to make the resting of the sciatic tuberosities and the initial part of the branch of the ischium and the pubis more comfortable and thus avoid their crushing; vice-versa, the bearings 16, in the inner zone 6' (see also FIG. 1), have a bevel of about 30°, in the form of a funnel, which has the purpose of having a wider technological support at the base and of making the channel 8 even wider in the upper part of the saddle, allowing the pelvic viscera described above to not undergo the slightest squashing.

In FIG. 1 it can be seen that the side edges 5" of the zones 5' are cove-shaped, in which the inside of the thighs are to be housed, so as to avoid rubbing on the walls of the saddle, during pedalling.

As can be seen in FIG. 3, it has proved optimal that the seat pillar 17 of the saddle has been adjusted so that its vertical axis 18 roughly coincides with the middle plane, in the longitudinal direction, of the parts 2.

Moreover, the holding fork 3 of the saddle frame is parallel to the zone 2" of the part 2 (FIG. 3) and when it is fixed to the seat pillar of the bicycle it must be in a position parallel to the ground-plane.

The invention claimed is:

1. A bicycle saddle having two longitudinally symmetrical identical portions (1', 1") having corresponding parts, each portion comprising:
   a) a rear part (2) having a slightly upwardly concave first rear zone (2'), an outer side part (2''') with downward convexity so as to follow a rider's buttocks muscle curvature, and a front zone (2") continuing forwardly from said rear zone (2') in a substantially downwardly inclined configuration with a depression ranging from 0 cm to about 3 to 5 cm, the two corresponding rear parts (2) of the bicycle saddle allow optimal reception in the bicycle saddle of the rider's buttocks and support for about 50% of the rider's body weight;
   b) a front part (6) about 1 to 3 cm lower than said rear part (2) and inclined upwardly to about 25° having a bearing (16) formed of soft plastic material, the upwardly inclined corresponding front parts (6) of the bicycle saddle support the respective ischium and pubis bones of the pelvis so that the rider's torso does not tend to fall forwards and supports 50% of the rider's body weight, the two front parts (6) of the bicycle saddle have an overall width which varies from 15cm to 6 cm and begin to gradually constrict at about half their longitudinal extension substantially forming a V-shaped configuration with a vertex (7) curving steeply downwardly in a substantially hook shape whereby the rider's genitalia do not come into contact with the bicycle saddle and are thus not compressed, each bearing (16) has an inner zone (6') which is bevelled about 30° between corresponding inner zones (6') of bearings (16); and c) a transversal middle part (5) which eases the connection from said rear part (2) to said front part (6), said middle part (5) continuing the downwardly inclined configuration of the front zone (2") of said rear part (2) and having a side cove-shaped zone (5');

wherein the two identical portions (1', 1") of the bicycle saddle are joined together at their respective rear parts (2) by a longitudinal trough (9) which terminates in a cove (10) at a rear edge of the bicycle saddle at the longitudinal axis thereof whereby the coccyx of the rider does not contact the seating plane during riding, and the two identical portions (1', 1") of the bicycle saddle are separated at their middle parts (5) and front parts (6) by a channel (8) which is much wider at its rear part with a width varying from 5 cm to a minimum of 3 cm whereby any squashing of the rider's pelvic viscera is avoided.

2. Saddle, according to claim 1, wherein the rear parts (2) of the two portions (1' and 1") of the saddle have a frame (14), with some holes (15) to ease transpiration of sweat deriving from a rider's buttocks resting upon it.

3. Saddle, according to claim 1, wherein a seat pillar (17) which supports the aforementioned saddle is arranged so that its vertical axis (18) roughly coincides with the middle plane, in the longitudinal direction, of the parts (2) of the two portions (1', 1") of the saddle.

* * * * *